United States Patent [19]
Ericksen et al.

[11] Patent Number: 5,649,793
[45] Date of Patent: Jul. 22, 1997

[54] SELF CENTERING DRILLING TOOL

[76] Inventors: Colin W. Ericksen; Richard E. Hardwick; Jeffrey S. Asher, all of 110 W. 6th Ave. #177, Ellensburg, Wash. 98926

[21] Appl. No.: 450,031

[22] Filed: May 25, 1995

[51] Int. Cl.[6] ................................................. B23B 51/00
[52] U.S. Cl. ........................... 408/81; 408/82; 408/112
[58] Field of Search ........................... 408/80–82, 84, 408/112

[56] References Cited

U.S. PATENT DOCUMENTS

| | | | |
|---|---|---|---|
| 347,925 | 8/1886 | Deno et al. | 408/84 |
| 2,224,480 | 12/1940 | Kartarik | 408/81 |
| 2,294,303 | 8/1942 | Jagow | 408/112 |
| 2,296,087 | 9/1942 | Burns, Jr. | 408/81 |
| 2,792,726 | 5/1957 | Vick | 408/81 |
| 5,318,390 | 6/1994 | DalBianco | 408/84 |

*Primary Examiner*—Steven C. Bishop

[57] ABSTRACT

The present invention is a self centering drilling device and is more particularly concerned with the aspect of precise location for removal of material with various sizes of drill bits, using the same drill bit holder.

4 Claims, 3 Drawing Sheets

SELF CENTERING DRILLING TOOL

FIELD OF INVENTION

This invention relates to the construction industry and in particular to the cabinet making and door hanging segments of that industry. This invention has a wide range of usage, but is most commonly used to drill pilot holes for screws for hinge installation.

DISCUSSION OF PRIOR ART

The current type of self centering drilling devices, requires a different size device for different drill size bits. The present devices have poor chip ejection ports and cannot make use of the European style carbide tipped brad point drill bits. Drilling into melamine covered materials with regular drill bits causes chipping around the hole and is unsatisfactory for such applications as adjustable shelf holes. Material during the drilling operation can migrate up the drill bit and become trapped inside the main body of current type drilling devices.

The present invention is developed to produce an efficient, cost effective method of drilling for pilot holes of varying sizes and for other uses, employing only one drill bit holder.

SUMMARY OF THE INVENTION

The present invention is a self centering drilling device, an object of the invention being a shank having a reduced diameter portion of a length for insertion into an electric drill motor chuck. The shank having a recessed hole to accept drill bits of various drilling diameters or a drill bit adapter having a diameter equal to the common shank diameter.

Another object of the invention is a generally tubular housing of sufficient diameter to accommodate a range of drill bit sizes with a common shank diameter. One end of the tubular housing designed to accept the shank, forming an assembly by means of a threaded hole in the shank and tublar housing for a set screw. The opposite end of the tublar housing having an inside diameter less than the larger outside diameter of the shank forming a flange stop for the device's tip. The tublar housing having a hollow interior with debris discharge aperture that communicates with the hollow interior.

Another object of the invention is a tip having a cylindrical shape of a size to pass through the smaller inside diameter of the tublar housing. The tip having a flange with an outside diameter less than the larger inside diameter of the tublar housing and greater than the outside diameter of the tip. The flange forming an interlocking stop. The tip having a counter bored area in the ranged end of the tip, allowing the drill bit shank to move into this area. The tip having a head end with a reduced diameter and a chamfer angle for use with smaller hinges. The tip having a hollow interior with a debris discharge aperture that communicates with the hollow interior.

A further object of the invention is a spring surrounding the drill bit, the spring captured inside the tublar housing partially compressed against the shank and tip. When lateral force is applied to the device, the spring is further compressed thereby bringing the drill bit into contact with a workpiece.

BRIEF DESCRIPTION OF THE DRAWINGS

Other objects and advantages of the invention will become apparent from the specification taken in conjunction with the accompanying drawings in which.

DETAILED DESCRIPTION OF THE INVENTION

Figure 1:
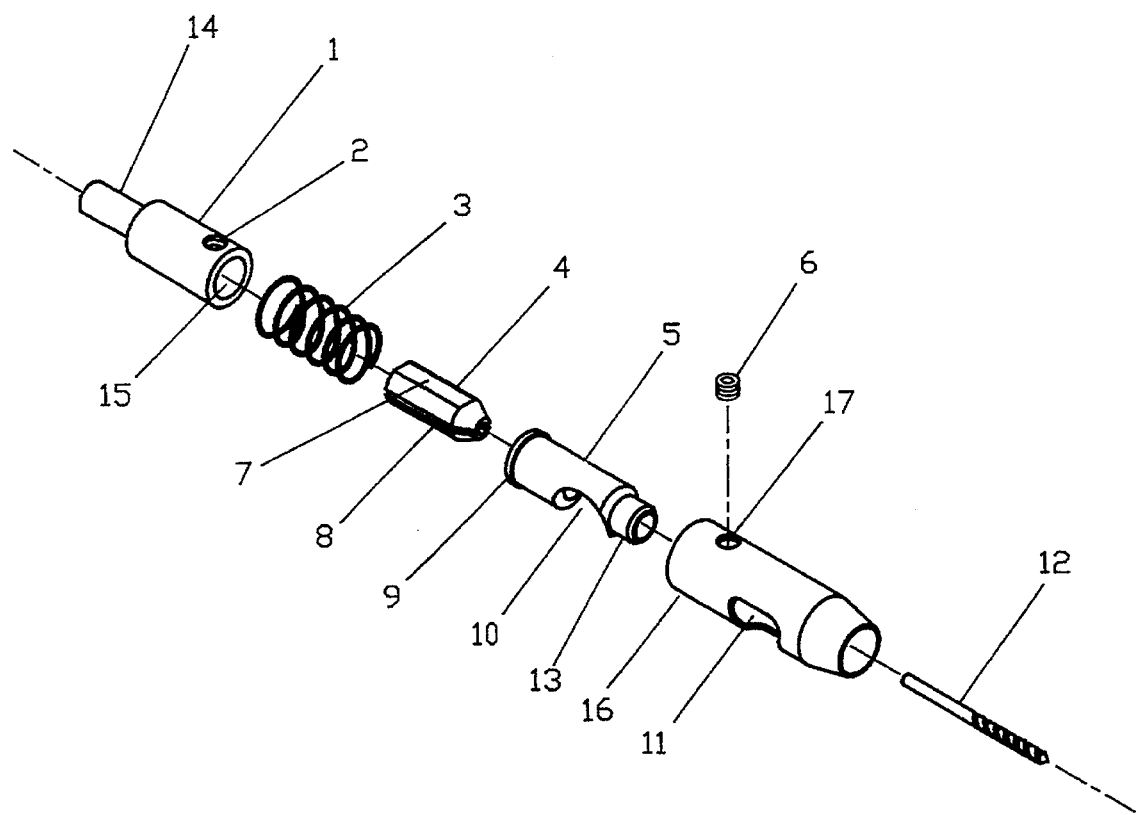
FIG. 1 is an exploded perspective view of the self centering drill tool.
Figure 2:
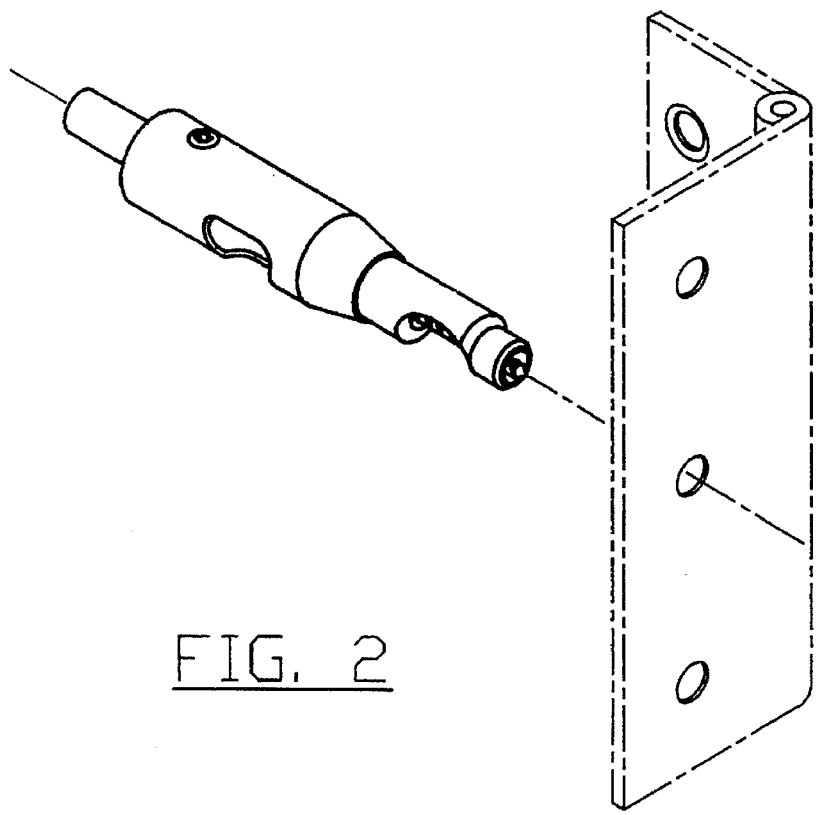
FIG. 2 is the self centering drilling tool, showing the tip relationship to a butt hinge.
Figure 3:
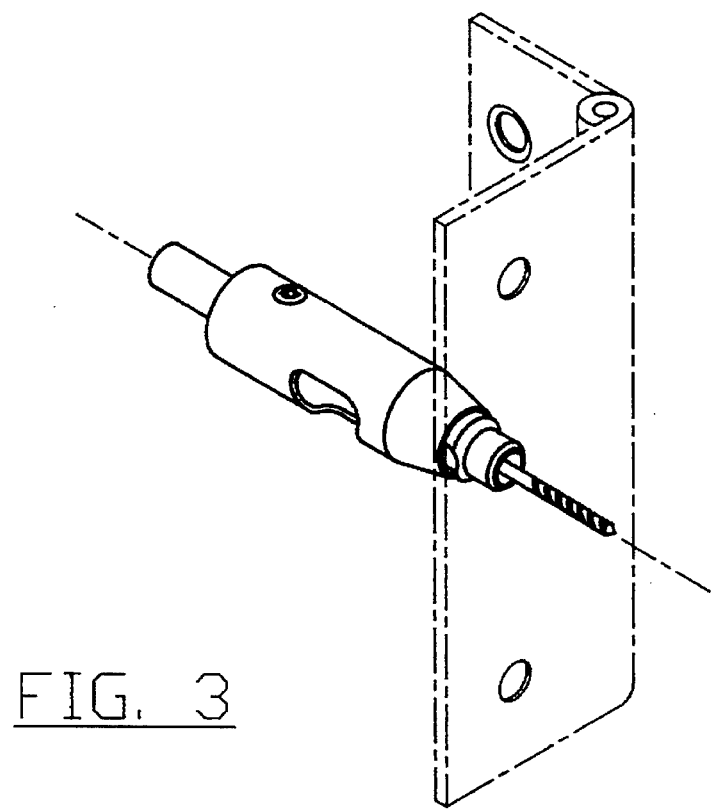
FIG. 3 is the self centering drilling tool with spring compressed projecting the drill bit, for a pilot hole, for screw attachment of a butt hinge.
Figure 4:
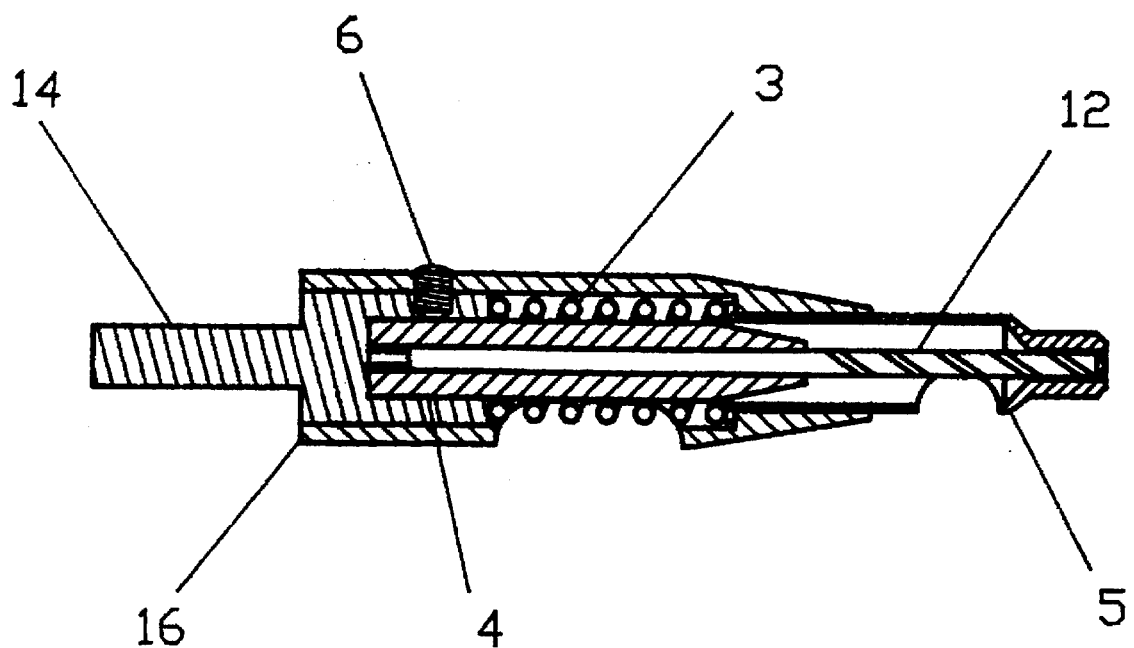
FIG. 4 is a sectional view of the completely assembled self centering drilling tool.

Referring to FIGS. 1 & 4, numeral 1 is the shank portion of the self centering drilling tool, having a reduced diameter 14 for insertion into an electric drill motor chuck. Shank 1 provided with a recessed hole 15 to accept the shank of drill bits, which have a common shank diameter regardless of the drilling diameter of the drill bit.

Shank 1 also having a threaded hole 2, thread matched to threaded hole 17, in body 16, hole 17 in body 16 and hole 2 in shank 1 for use with set screw 6 in uniting shank 1 and body 16 in an assembly.

Set screw 6 passing through hole 17 and hole 2 intersecting flat 7 of adapter 4. Drill bit adapter 4 having an outside diameter the same size as the common shank diameter. Adapter 4 having a hole center to accept standard twist drill bit 12. Drill bit adapter 4 provided with a slot 8 intersecting with the hole center, so when set screw 6 applies pressure on flat 7, adapter 4 compresses to capture drill bit 12 in adapter 4.

Tip 5 having a flange 9 to intersect with a flange inside of body 16, preventing tip 5 from passing through body 16.

Spring 3 presses against shank 1, surrounds adapter 4 and presses against flange 9 on tip 5. Body 16 having an axial hole with a reduced inside diameter at the end to act as a stop to tip 5. The diameter of the holes being such that the tip can pass freely through body 16 until flange 9 intersects the reduced inside diameter portion of body 16. Body 16 having a debris port 11 to allow any material traveling up the drill bit during the drilling process to escape.

In operation, the chamfer 13 at the front end of tip 5 is placed into the screw hole of a hinge, which acts as a template. As the drill bit is rotated, the drill bit 12 is advanced against the pressure of spring 3, drilling the hole until flange 9 on tip 5 contacts the flange inside of body 16, stopping advance of the drill bit.

What is claimed is:

1. A self centering drilling devices for use with a drill motor and a drill bit, said self centering drilling device having a generally cylindrical shape and comprising:
   a) a shank including:
      i) a reduced diameter portion on one end for connecting said shank to the drill motor;
      ii) a recessed hole defined in said shank on one end opposite said one end; and
      iii) a first threaded hole defined in said shank perpendicular to and intersecting said recessed hole;
   b) a set screw adapted to engage said threaded hole and having a screw diameter;
   c) a drill bit adapter at least partially disposed within said recessed hole and including:
      i) an axial hole defined in said drill bit adapter for receiving the drill bit;
      ii) a linear slit defined in said drill bit adapter intersecting said axial hole;

iii) a linear flat surface having a width greater than said screw diameter; and iv) said drill bit adapter securable in said shank by said set screw;

d) a tip for positioning said drilling devise, said tip having first and second opposed ends and including:

i) a reduced tip portion on said first end, said reduced tip portion having a reduced diameter and terminating with a chamfer;

ii) a flange formed on said second end and having a flange diameter;

iii) a first material ejection port defined in said tip; and iv) a hole defined in said tip extending through said tip between said first and second ends for passage of the drill bit, said hole including a counter bored portion having a diameter sized to allow passage of said drill bit adapter into said tip, and wherein said first material ejection port intersects said counter bored portion;

e) a cylindrical body having first and second opposed ends and including:

i) a passage defined in said body extending between said first and second ends of said body, said passage having a first portion having a first end of said body, and a second portion having a second diameter proximate said second end of said body;

ii) first said diameter being greater than said reduced diameter and said flange diameter of said tip, said second diameter being greater than said reduced diameter and less than flange diameter, whereby said flange may pass into said body through said passage from said first end of said passage until said flange abuts second portion;

iii) a second material ejection port formed in said body and intersecting said passage; and iv) a second threaded hole defined in said body perpendicular to and intersecting said passage;

f) a spring biasing said tip away from said shank, said spring having an outside diameter sized to pass into said passage of said body and an inside diameter sized to receive said drill bit adapter, said spring having at least two opposed ends abutting said flange and said shank, respectively; and g) wherein said shank is at least partially disposed within said passage of said body and is retained therein by said set screw which extends through said second threaded hole of said body.

2. A self centering drilling device for use with a drill motor and a drill bit, said self centering drilling device having a generally cylindrical shape and comprising:

a) a shank including:

i) a reduced diameter shank portion on one end for connecting said shank to the drill motor;

ii) a recessed hole defined in said shank on an end opposite said one end, said recessed hole sized and configured to receive the drill bit; and iii) a first threaded hole defined in said shank perpendicular to and intersecting said recessed hole;

b) a set screw adapted to engage said threaded hole, the drill bit securable in said shank by set screw;

c) a tip for positioning said drilling device, said tip having first and second opposed ends and including:

i) a reduced tip portion on said first end, said reduced tip portion having a reduced diameter and terminating with a chamfer;

ii) a flange formed on said second end and having a flange diameter;

iii) a hole defined in said tip extending through said tip between said first and second ends for passage of the drill bit; and iv) a first material ejection port defined in said tip and intersecting said hole;

d) a cylindrical body having first and second opposed ends and including:

i) a passage defined in said body extending between said first and second ends of said body, said passage having a first portion having a first diameter proximate said first end of said body, and a second portion having a second diameter proximate said second end of said body;

ii) said first diameter being greater than said reduced diameter and said flange diameter of said tip, said second diameter being greater than said reduced diameter and less than said flange diameter, whereby said flange may pass into said body through said passage from said first end of said passage until said flange abuts said second portion;

iii) a second material ejection port formed in said body and intersecting said passage; and iv) a second threaded hole defined in said body perpendicular to and intersecting said passage;

e) a spring for biasing said tip away from said shank, and spring having an outside diameter sized to pass into said passage of said body and an inside diameter sized to receive the drill bit, said spring having at least two opposed ends abutting said flange and said shank, respectively; and f) wherein said shank is at least partially disposed within said passage of said body and is retained therein by said set screw which extends through said second threaded hole of said body.

3. The self centering drilling device of claim 2 wherein said recessed hole of said shank is sized and configured to receive an enlarged bit shank forming a part of this drill bit.

4. The self centering drilling device of claim 2 further including a drill bit adapter at least partially disposed within said recessed hole and including:

a) an axial hole defined in said drill bit adapter for receiving the drill bit;

b) a linear slit defined in said drill bit adapter intersecting said axial hole; and c) a linear flat surface.

* * * * *